(12) United States Patent
Hara et al.

(10) Patent No.: US 11,976,442 B2
(45) Date of Patent: May 7, 2024

(54) CONSTRUCTION MACHINE

(71) Applicant: Yanmar Power Technology Co., Ltd., Osaka (JP)

(72) Inventors: Naohiro Hara, Osaka (JP); Shingo Eguchi, Osaka (JP); Keishi Yamanaka, Osaka (JP); Tatsuya Fujimori, Osaka (JP); Masaki Yamada, Osaka (JP); Kensuke Kaneda, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 530 days.

(21) Appl. No.: 17/269,389

(22) PCT Filed: Jul. 23, 2019

(86) PCT No.: PCT/JP2019/028746
§ 371 (c)(1),
(2) Date: Feb. 18, 2021

(87) PCT Pub. No.: WO2020/039819
PCT Pub. Date: Feb. 27, 2020

(65) Prior Publication Data
US 2021/0172152 A1 Jun. 10, 2021

(30) Foreign Application Priority Data
Aug. 21, 2018 (JP) ................................. 2018-154735

(51) Int. Cl.
*E02F 9/12* (2006.01)
*E02F 3/32* (2006.01)
(Continued)

(52) U.S. Cl.
CPC .............. *E02F 9/123* (2013.01); *E02F 3/325* (2013.01); *E02F 3/435* (2013.01); *E02F 9/2004* (2013.01); *G06N 5/04* (2013.01); *G06N 20/00* (2019.01)

(58) Field of Classification Search
CPC ......... E02F 9/123; E02F 3/325; E02F 9/2004; E02F 3/435; G06N 20/00; G06N 5/04
(Continued)

(56) References Cited

U.S. PATENT DOCUMENTS

2014/0173946 A1* 6/2014 Gerrits ...................... E02F 9/16
56/14.7
2014/0222274 A1* 8/2014 Sugiyama ............. H02J 7/1423
903/903
(Continued)

FOREIGN PATENT DOCUMENTS

JP 2010-138586 A 6/2010
JP 2010-150898 A 7/2010
(Continued)

OTHER PUBLICATIONS

International Search Report dated Oct. 8, 2019 issued in corresponding PCT Application PCT/JP2019/028746 cites the patent documents above.

*Primary Examiner* — Mahmoud S Ismail
(74) *Attorney, Agent, or Firm* — NORTON ROSE FULBRIGHT US LLP

(57) ABSTRACT

A construction machine includes an attitude sensor that detects the current attitude of an upper turning body; a reference angular acceleration calculation unit that calculates a reference angular acceleration to be generated when an electric turning motor is driven by a torque command value generated according to the operation amount of an operation part; a reference gravity torque calculation unit that, on the basis of the current attitude and the deviation (Continued)

between an actual angular acceleration, calculates a reference gravity torque; a gravity compensation torque calculation unit that calculates a gravity compensation torque for compensating a torque component generated about the turning axis by the gravity in the current attitude; and a correction unit that corrects the torque command value by using the gravity compensation torque so as to cancel the torque component generated about the turning axis by the gravity in the current attitude.

20 Claims, 8 Drawing Sheets

(51) Int. Cl.
*E02F 3/43* (2006.01)
*E02F 9/20* (2006.01)
*G06N 5/04* (2023.01)
*G06N 20/00* (2019.01)

(58) Field of Classification Search
USPC .......................................................... 701/50
See application file for complete search history.

(56) References Cited

U.S. PATENT DOCUMENTS

2017/0335547 A1* 11/2017 Wu .......................... B60K 6/48
2019/0285093 A1* 9/2019 Muraoka ................. E02F 9/123

FOREIGN PATENT DOCUMENTS

| JP | 2011-006862 A | 1/2011 |
| JP | 2012-122327 A | 6/2012 |
| JP | 2015-214808 A | 12/2015 |

* cited by examiner

CONSTRUCTION MACHINE

CROSS REFERENCES TO RELATED APPLICATIONS

This application is a national stage application pursuant to 35 U.S.C. § 371 of International Application No. PCT/JP2019/028746, filed on Jul. 23, 2019 which claims priority under 35 U.S.C. § 119 to Japanese Patent Application No. 2018-154735 filed on Aug. 21, 2018, the disclosures of which are hereby incorporated by reference in their entireties.

TECHNICAL FIELD

The present disclosure relates to a construction machine that turns by means of an electric turning motor.

BACKGROUND ART

For example, as described in Patent Literature 1 and 2, hybrid type electric turning construction machines are being developed that drive an upper turning body with an electric turning motor, and drive a work machine or a traveling body with a hydraulic actuator. In addition to a cabin and an engine, an upper turning body is equipped with a work machine, such as a boom and an arm. A work machine has a large weight, and the moment of inertia of the upper turning body differs depending on whether the boom or the arm is in an extended state or a contracted state. On sloping ground, gravity generates a torque about the rotation axis of the upper turning body in a descending direction of the sloping ground. It is known that this torque adversely affects turning motion.

In Patent Literature 1, a technique is disclosed that, in order to ensure that a stationary state of the upper turning body is maintained on sloping ground, switches a control command of the electric turning motor from a speed control to a position control when an operation lever is in a neutral position and the target speed of the upper turning body falls below a predetermined threshold.

In Patent Literature 2, disclosed as a turning drive control device of a construction machine which is driven to turn by an electric motor is a control device that, when turning motion in the opposite direction to a turning operation direction is detected, reduces the turning motion in the opposite direction on the condition that the construction machine is not positioned on flat ground.

CITATION LIST

Patent Literature

Patent Literature 1: Japanese Unexamined Patent Application Publication No. 2012-122327
Patent Literature 2: Japanese Unexamined Patent Application Publication No. 2010-138586

DISCLOSURE OF INVENTION

Problems to be Solved by the Invention

However, in Patent Literature 1 and 2, a torque component generated by gravity, and the change in the torque component caused by expansion and contraction of the boom or the arm are not considered, and therefore, even when the operation amount is the same, the behavior differs when turning in an ascending direction of the sloping ground and when turning in a descending direction of the sloping ground, which results in a loss of turning operability.

In Patent Literature 2, because a control that reduces the turning motion in the opposite direction does not come into effect until the turning motion in the opposite direction to the turning operation direction is detected, an unintended drop of the upper turning body always occurs.

In both Patent Literature 1 and 2, because a feedback control is performed that detects the rotation speed and then reduces the deviation with respect to a target rotation speed, the speed control takes effect after the adverse effect of the torque component generated by gravity on the sloping ground has actually adversely affected the rotation speed, which results in a loss of turning operability.

In view of the above problems, the present disclosure provides a construction machine capable of comfortably performing turning motion on sloping ground without exhibiting the adverse effects of a torque component generated by gravity.

Means for Solving the Problems

A construction machine of the present disclosure includes:
an upper turning body comprising a work machine;
a lower traveling body that supports the upper turning body so as to be capable of turning via a turning axis;
an electric turning motor that causes the upper turning body to turn;
a rotation speed acquisition unit that acquires a value representing a rotation speed of the upper turning body;
an attitude sensor that detects a current attitude of the upper turning body;
a torque command value generation unit that outputs a torque command value to the electric turning motor according to an operation amount of an operation part;
a reference angular acceleration calculation unit that calculates a reference angular acceleration to be generated when the electric turning motor is driven at the torque command value;
a reference gravity torque calculation unit that calculates a reference gravity torque which is a torque component generated about the turning axis by gravity in a reference attitude on the basis of the current attitude and a deviation between an actual angular acceleration obtained from the rotation speed and the reference angular acceleration;
a gravity compensation torque calculation unit that calculates a gravity compensation torque for compensating a torque component generated about the turning axis by gravity in the current attitude on the basis of the reference gravity torque and the current attitude; and
a correction unit that corrects the torque command value with the gravity compensation torque so as to cancel a torque component generated about the turning axis by gravity in the current attitude.

As described above, a feed-forward control is provided that, on the basis of the current attitude and the reference gravity torque, which is a torque component generated about the turning axis by gravity in the reference attitude, corrects the torque command value so as to cancel the torque component generated about the turning axis by gravity in the current attitude, and therefore, a control can be performed that cancels the torque component in advance even when a delay in the rotation speed caused by the torque component generated by gravity has not actually occurred.

Meanwhile, the reference gravity torque, which is the torque component generated about the turning axis by gravity in the reference attitude, is calculated on the basis of the current attitude and the deviation between the actual angular acceleration and the reference angular acceleration to be generated when the electric turning motor is driven at the torque command value, and therefore, it is possible to appropriately cancel the torque component generated by gravity in the current attitude even when the weight changes, or when the boom or the arm is expanded or contracted.

Therefore, it is possible to comfortably perform turning motion on sloping ground without exhibiting the adverse effects of a torque component generated by gravity.

DESCRIPTION OF EMBODIMENTS

First Embodiment

Hereinafter, a first embodiment of the present disclosure will be described with reference to the drawings.

Figure 1:
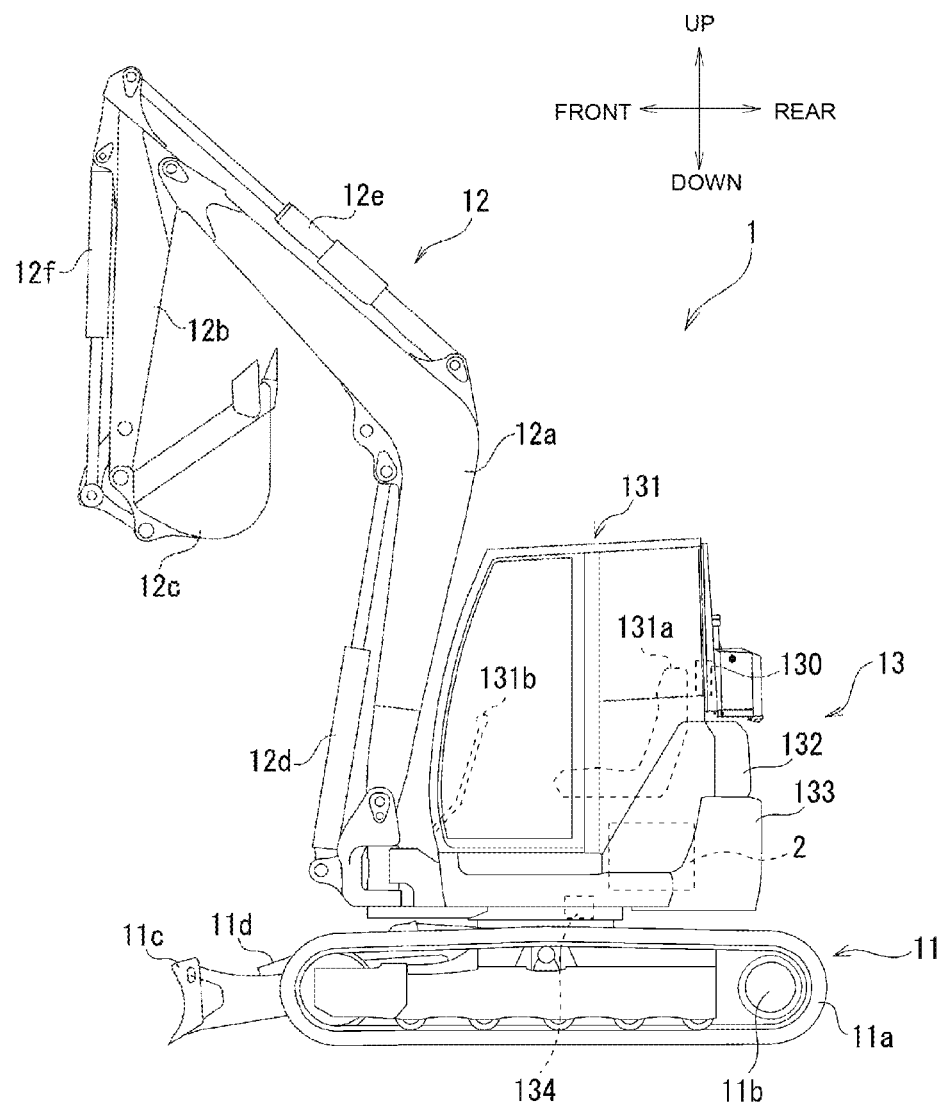
FIG. 1 is a side view showing a backhoe of a first embodiment.
Figure 2:
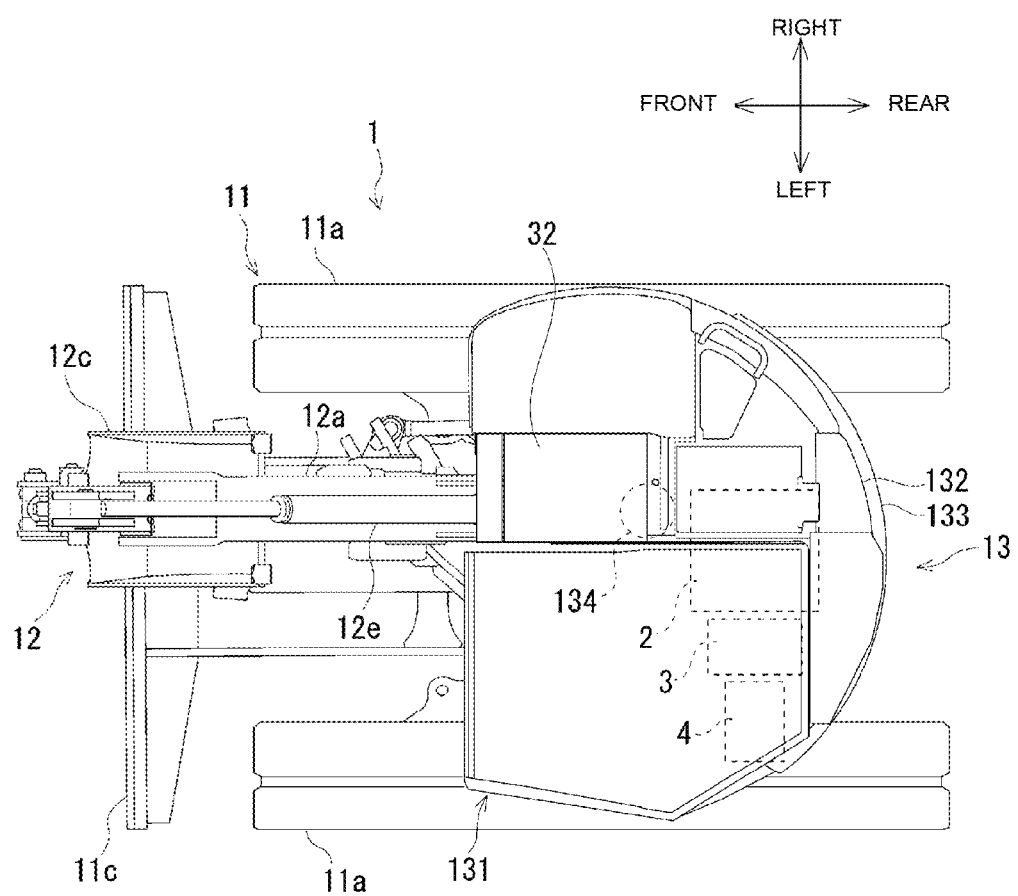
FIG. 2 is a plan view showing the backhoe of the first embodiment.

As shown in FIG. 1 and FIG. 2, a schematic structure of a backhoe 1 will be described as an example of a hybrid construction machine. The backhoe 1 includes a lower traveling body 11, a work machine 12, and an upper turning body 13.

The lower traveling body 11 is driven by receiving power from an engine 2 housed inside the upper turning body 13, and causes the backhoe 1 to travel. The lower traveling body 11 includes a pair of left and right crawlers 11a and 11a, and a pair of left and right traveling motors 11b and 11b. The forward and backward movement of the backhoe 1 is made possible as a result of the pair of left and right traveling motors 11b and 11b, which are hydraulic motors, driving each of the pair of left and right crawlers 11a and 11a. Furthermore, the lower traveling body 11 is provided with a blade 11c, and a blade cylinder 11d for causing the blade 11c to rotate in the up-down direction.

The work machine 12 is driven by receiving power from the engine 2, and performs excavation work with respect to earth and sand and the like. The work machine 12 includes a boom 12a, an arm 12b, and a bucket 12c, and excavation work is made possible by independently driving these components. The boom 12a, the arm 12b, and the bucket 12c each correspond to a working unit, and the backhoe 1 has a plurality of working units.

One end of the boom 12a is supported by the front portion of the upper turning body 13, and is rotated by a boom cylinder 12d that can be freely expanded and contracted. Furthermore, one end of the arm 12b is supported by the other end of the boom 12a, and is rotated by an arm cylinder 12e that can be freely expanded and contracted. In addition, one end of the bucket 12c is supported by the other end of the arm 12b, and is rotated by a bucket cylinder 12f that can be freely expanded and contracted.

The upper turning body 13 is configured so as to be capable of turning with respect to the lower traveling body 11 via a turning bearing (not shown), which is a turning axis. A cabin 131, a bonnet 132, a counterweight 133, an electric turning motor 134, the engine 2, an attitude sensor 130, and the like are arranged in the upper turning body 13. The upper turning body 13 turns via the turning bearing (not shown) by the driving force of the electric turning motor 134. Furthermore, an electric generator 3 and a hydraulic pump 4, which are driven by the engine 2, are arranged in the upper turning body 13. The hydraulic pump 4 supplies hydraulic oil to each hydraulic motor and each cylinder.

The attitude sensor 130 detects the current attitude of the upper turning body 13. The current attitude is represented by a roll angle, which has the front-rear direction of the upper turning body 13 as the rotation axis, and a pitch angle, which has the left-right direction of the upper turning body 13 as the rotation axis. A yaw angle, which has the up-down direction of the upper turning body 13 as the rotation axis, is not used because it can be found by the rotation of the electric turning motor 134. Although the attitude sensor 130 is a gyroscope in the present embodiment, it is not limited thereto, and various modifications are possible.

The cabin 131 is erected on the left side portion of the upper turning body 13. A driver's seat 131a is arranged in the cabin 131. A pair of work operation levers 131c is arranged on the left and right sides of the driver's seat 131a (see FIG. 3), and a pair of travel levers 131b and 131b is arranged at the front. An operator sits in the driver's seat 131a and operates the work operation levers 131c, the travel levers 131b and 131b, and the like to control the engine 2, the hydraulic motors, and the hydraulic cylinders, which enables traveling, turning, and work and the like to be performed.

The bonnet 132 and the counterweight 133 are vertically arranged on the rear end portion of the upper turning body 13. The counterweight 133 is erected on the rear end portion of the upper turning body 13, and covers the engine 2. The bonnet 132 extends upward from the upper end portion of the counterweight 133 so as to reach the lower end portion of the rear wall of the cabin 131, and covers the engine 2 together with the counterweight 133. The rear end portion of the upper turning body 13 is formed with an arc shape in plan view, and the bonnet 132 and the counterweight 133 are formed so as to be curved along the rear end portion of the upper turning body 13. The backhoe 1 of the present embodiment is called a rear small turning type.

Figure 3:
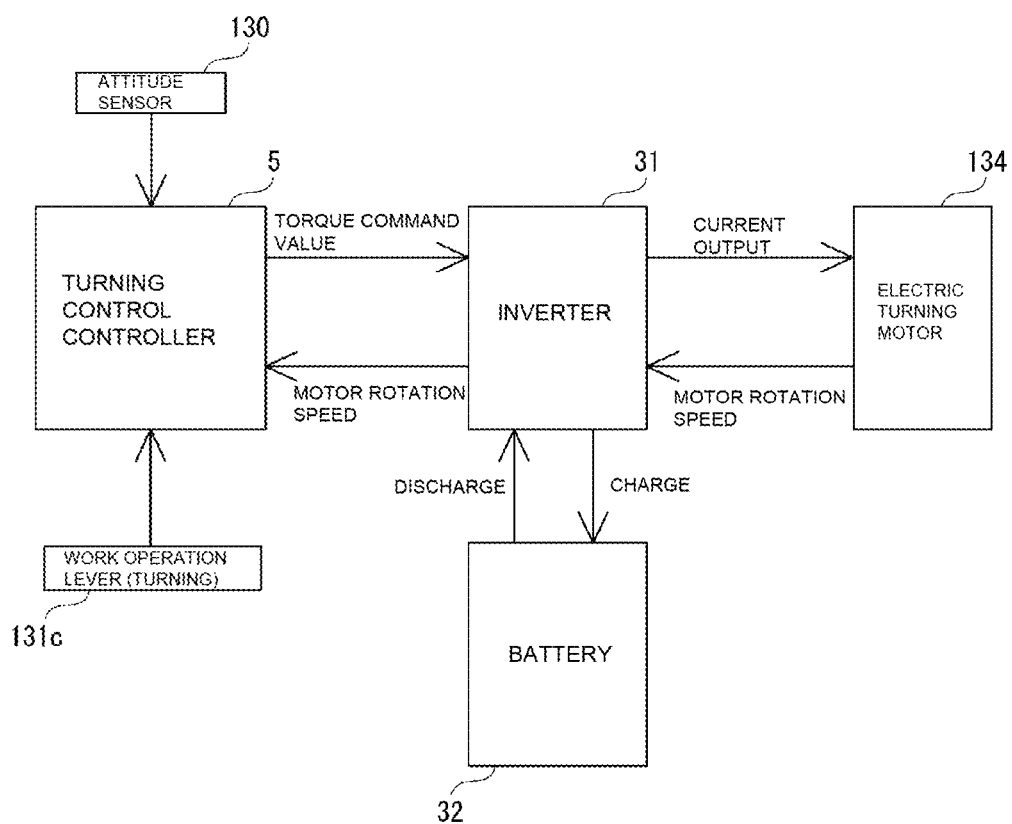
FIG. 3 is a diagram showing an electric circuit mounted on the backhoe of the first embodiment.

Next, the configuration of the electric circuit mounted on the backhoe 1 will be described. As shown in FIG. 3, the backhoe 1 includes a turning control controller 5, an inverter 31, a battery 32, and an electric turning motor 134. The turning control controller 5 controls the drive of the electric turning motor 134 on the basis of a turning operation amount of the work operation levers 131c (operation parts), the current attitude detected by the attitude sensor 130, and the motor rotation speed per unit time [rpm]. The electric turning motor 134 is controlled by the turning control controller 5 via the inverter 31. The electric turning motor 134 is connected to the battery 32 via the inverter 31. The battery 32 supplies drive energy to the electric turning motor 134. As shown in FIG. 2, the battery 32 is arranged on the right side of the cabin 131. The inverter 31 controls the electric turning motor 134. The inverter 31 discharges power from the battery 32 and drives the electric turning motor 134 on the basis of a torque command value from the turning control controller 5. The inverter 31 acts as a rotation speed acquisition unit and inputs the rotation speed per unit time of the electric turning motor 134 to the turning control controller 5. Of course, a separate sensor may be provided to detect the rotation speed of the upper turning body 13.

Figure 4:
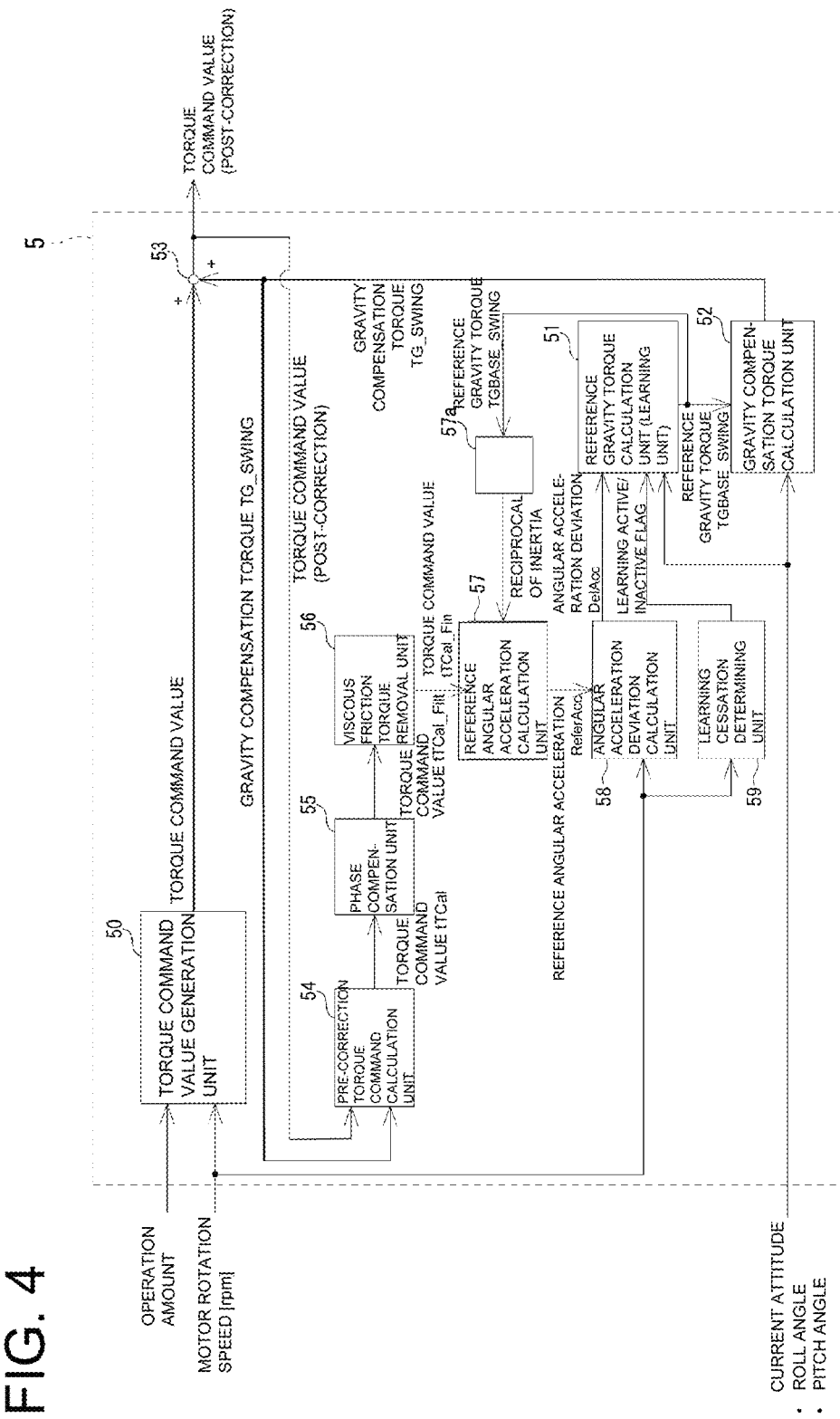
FIG. 4 is a diagram showing a turning control controller of the first embodiment.

Next, the configuration of the turning control controller 5 will be described. As shown in FIG. 4, the turning control controller 5 has a torque command value generation unit 50.

The torque command value generation unit 50 outputs a torque command value to the electric turning motor 134 according to an operation amount of the work operation levers 131c, which are operation parts. Although the torque command value generation unit 50 is not described in detail because it represents a conventional turning control performed on flat ground, it outputs the torque command value so that the deviation is eliminated between a target rotation speed determined according to the operation amount, and an actual rotation speed represented by the motor rotation speed per unit time.

As shown in FIG. 4, in order to cancel the torque component generated by gravity, the turning control controller 5 includes a reference gravity torque calculation unit 51, a gravity compensation torque calculation unit 52, and a correction unit 53.

Figure 5:
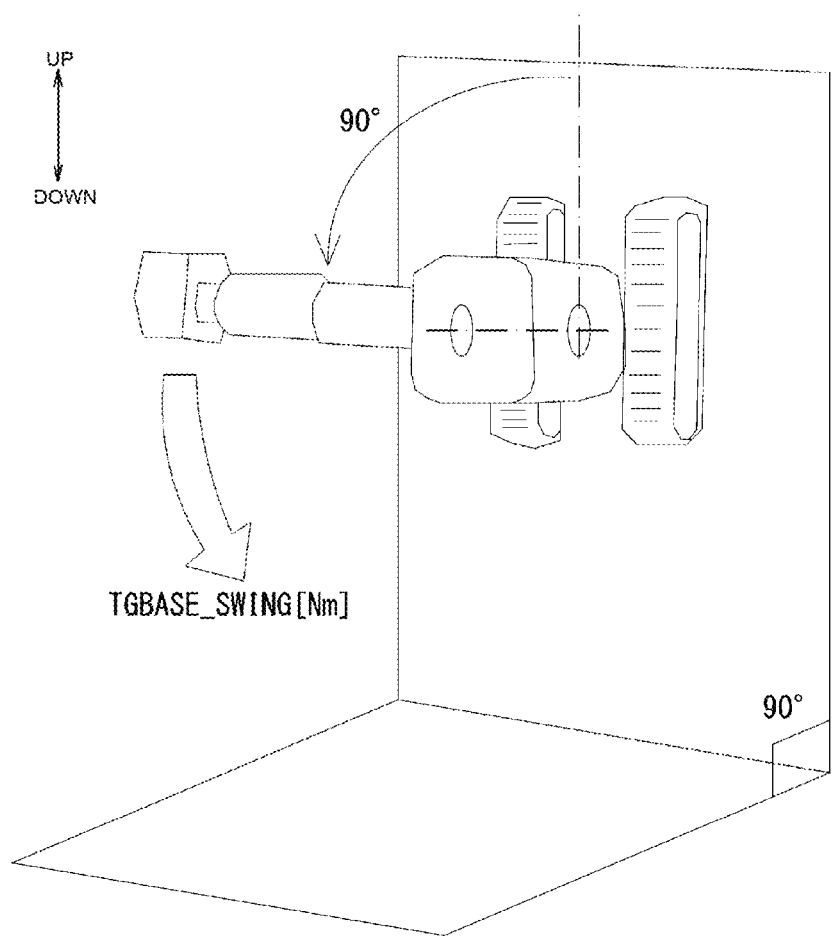
FIG. 5 is a diagram showing an example of a reference attitude.

The reference gravity torque calculation unit 51 calculates a reference gravity torque TGBASE_SWING, which is a torque component generated about the turning axis by gravity in the reference attitude. Although various reference attitudes can be set, as shown in FIG. 5, in the present embodiment the reference attitude is an attitude in which the angle of the slope is 90 degrees, and the bucket position is 90 degrees from the front. The reference attitude is an attitude in which the moment of the force generated by gravity acts 100% on the rotation axis. The reference gravity torque calculation unit 51 calculates a reference gravity torque on the basis of the current attitude and a deviation between the actual angular acceleration and the reference angular acceleration to be generated when the electric turning motor is driven at the torque command value. When the reference angular acceleration to be generated on the basis of the torque command value output to the electric turning motor 134 is calculated by a prediction, it is currently thought that when the actual angular acceleration is slower than the predicted reference angular acceleration, this is due to the effect of gravity, and conversely, when the actual angular acceleration is faster, this is also due to the effect of gravity. Therefore, the true reference gravity torque has been calculated when the deviation between the angular accelerations is eliminated.

The gravity compensation torque calculation unit 52, on the basis of the reference gravity torque calculated by the reference gravity torque calculation unit 51 and the current attitude, calculates a gravity compensation torque for compensating a torque component generated about the turning axis by gravity in the current attitude. This utilizes the fact that the gravity compensation torque can be calculated using an inner product of the reference gravity torque and the current attitude (roll angle, pitch angle). The detailed formula will be described later.

The correction unit 53 uses the gravity compensation torque calculated by the gravity compensation torque calculation unit 52 to correct the torque command value with the gravity compensation torque so as to cancel the torque component generated about the turning axis by gravity in the current attitude. An addition is performed in the drawing because the gravity compensation torque is calculated as a negative value to perform the cancellation.

The above is an outline, and the details will now be described.

A pre-correction torque command calculation unit 54 calculates a pre-correction torque command value on the basis of the torque command value after correction by the correction unit 53 and the gravity compensation torque used by the correction unit 53. This is because the torque command value used to estimate the reference angular acceleration is calculated by subtracting the gravity compensation torque component from the current torque command value (post-correction). The formula is expressed as follows.

$$\text{Pre-correction torque command value } tTCal \text{ [Nm]}$$
$$= \text{Post-correction torque command value}_{i-1} -$$
$$\text{Gravity compensation torque}_{i-1}$$

The unit of tTCal is Newton meters. Here, the "i−1" appended to the post-correction torque command value and the gravity compensation torque indicates that they are previous values. The value i represents the current value, and i−1 represents the previous value. The current value is assumed unless otherwise specified.

A phase compensation unit 55 performs processing that delays the phase of the torque command value before being input to the reference angular acceleration calculation unit 57, which calculates the reference angular acceleration to be generated when the electric turning motor 134 is driven at the torque command value. This is because it has been found that even if a current corresponding to the torque command value is input to the electric turning motor 134, the desired angular acceleration is not immediately exhibited, and the phase (time) is slightly delayed. That is to say, as a result of delays in communication and delays due to current control by the inverter, a shift occurs in the time axis between the turning motion estimated from the torque command value of the current instruction (angular acceleration), and the turning motion currently being detected (actual angular acceleration). The phase compensation unit 55 compensates for this deviation in the time axis (phase). Specifically, in the present embodiment, a low-pass filter is applied to the torque command value. The formula is as follows:

$$\text{Post-compensation torque command value}$$
$$tTCal\_Filt = \alpha * tTCal + (1-\alpha) * tTCal\_Filt_{i-1}$$

Although a low-pass filter is used in the present embodiment, it is not limited to this as long as the torque command value can be delayed.

Although the accuracy will deteriorate, it is possible to omit the phase compensation unit 55.

A viscous friction removal unit 56 removes a viscous friction torque from the torque command value because the viscous friction torque required to maintain the motor rotation speed $\omega_{SWING}$ [rpm] does not contribute to the increase or decrease in the angular acceleration. The formula is as follows:

$$tTVis = K_{CVIS} \times \omega_{SWING}$$

Post-removal torque command value
tTCal_Fin=tTCal_Filt−tTVis

Here, $K_{CVIS}$ is a viscous friction coefficient. Although the accuracy will deteriorate, it is possible to omit the viscous friction removal unit 56.

A reference angular acceleration calculation unit 57 calculates a reference angular acceleration ReferAcc to be generated when the electric turning motor 134 is driven at the torque command value. Specifically, the angular acceleration ReferAcc is calculated by multiplying the torque command value tTCal_Fin by the reciprocal of the inertia. The formula is as follows:

Angular acceleration ReferAcc=Torque command value *tTCal_Fin*\*Table(TGBASE_SWING)

The reciprocal of the inertia (moment of inertia) is acquired from a table which takes the reference gravity torque TGBASE_SWING as input. The table is correlation data 57a that associates a value representing the inertia (reciprocal of the inertia) of the upper turning body 13, which includes the work machine 12, with the reference gravity torque in advance. The reference gravity torque and the inertia (moment of inertia) are not in a 1:1 relationship, and the inertia cannot be calculated directly from the reference gravity torque. However, undetermined variables in the correlation data 57a are approximated as having only small variations in the backhoe 1. In this way, because the inertia is associated in advance in the correlation data as an approximated value, a value representing the inertia (reciprocal of the inertia) can be derived and the reference angular acceleration can be calculated. The correlation data 57a uses predicted values or actually measured values.

An actual angular acceleration deviation calculation unit 58 calculates a deviation DelAcc between an actual angular acceleration ActAcc, which is obtained from a value representing the rotation speed (motor rotation speed), and the reference angular acceleration ReferAcc. The actual angular acceleration ActAcc is, as shown in the following formula, calculated from the forward difference of the motor rotation speed [rpm]:

Actual angular acceleration: ActAcc=$(\omega_{SWING}-\omega_{SWING,i-1})/\Delta T[s]$ Angular acceleration deviation: DelAcc=−(ActAcc−ReferAcc)

In the present embodiment, the reference gravity torque calculation unit 51 is a learning unit that newly calculates the reference gravity torque TGBASE_SWING on the basis of the reference gravity torque $TGBASE\_SWING_{i-1}$ calculated the previous time, the angular acceleration deviation DelAcc, and the current attitude (roll angle, pitch angle). In this way, because the reference gravity torque calculation unit 51 performs the calculation using the reference gravity torque $TGBASE\_SWING_{i-1}$ calculated the previous time, it is capable of learning the previous result and improving the compensation accuracy.

Specifically, as shown in the following formula, the new reference gravity torque TGBASE_SWING is calculated by executing learning processing that cumulatively adds the angular acceleration deviation DelAcc multiplied by a gain to the reference gravity torque $TGBASE\_SWING_{i-1}$.

Reference gravity torque
TGBASE_SWING=Reference gravity torque $TGBASE\_SWING_{i-1}$+Gain×Angular acceleration deviation DelAcc The gain is such that, by taking a product containing the inner product value of a gravity vector and the turning direction [cos(pitch angle)×sin(roll angle], learning is active only when gravity caused by a slope contributes to the turning.

Gain=Gain constant×cos(pitch angle)×sin(roll angle)

In the present embodiment, although the reference gravity torque calculation unit 51 is a learning unit that executes learning processing that cumulatively adds to the reference gravity torque $TGBASE\_SWING_{i-1}$ calculated the previous time, the learning processing does not have to be executed.

For example, a configuration is possible in which the reference gravity torque TGBASE_SWING is directly calculated by multiplying the angular acceleration deviation DelAcc by a conversion coefficient, or a table or function format that takes the angular acceleration deviation DelAcc as an input value and outputs the reference gravity torque TGBASE_SWING is also possible.

The gravity compensation torque calculation unit 52, on the basis of the reference gravity torque TGBASE_SWING calculated by the reference gravity torque calculation unit 51 and the current attitude (roll angle, pitch angle), calculates a gravity compensation torque TG_SWING for compensating a torque component generated about the turning axis by gravity in the current attitude. The formula is as follows:

Gravity compensation torque
TG_SWING=Reference gravity torque TGBASE_SWING\*cos(pitch angle)×sin(roll angle)

A learning cessation determining unit 59 determines whether or not a state in which learning should be stopped has occurred. The state in which learning should be stopped is a state where the upper turning body 13 is accelerating in a descending direction of a sloping surface, or a state where the upper turning body 13 is decelerating in an ascending direction of a sloping surface. The learning cessation determining unit 59 outputs the determination result as a learning active/inactive flag. The learning active/inactive flag is input to the reference gravity torque calculation unit 51. The reference gravity torque calculation unit 51 is configured such that, when the learning cessation determining unit 59 determines that a state in which learning should be stopped has occurred, the reference gravity torque calculated the previous time is used as the new reference gravity torque, and learning processing using the angular acceleration deviation is not executed. In the learning stopped state, the reference gravity torque is calculated by the following formula.

Formula in Learning Stopped State:

Reference gravity torque
TGBASE_SWING=Reference gravity torque $TGBASE\_SWING_{i-1}$ On the other hand, if the learning cessation determining unit 59 determines a state in which learning should be stopped has not occurred, the reference gravity torque calculation unit 51 executes learning processing using the deviation described above. The formula is reproduced below.

Formula in Learning State:

Reference gravity torque
TGBASE_SWING=Reference gravity torque $TGBASE\_SWING_{i-1}$+Gain×Angular acceleration deviation DelAcc The deviation that occurs between the actual angular acceleration and the reference angular acceleration to be generated on the basis of the torque command is caused by a change in the moment of inertia due to an expansion or contraction in the boom or the arm, or by a change in the gravity torque due to a change in the load weight. Because it is not possible to distinguish whether the moment of inertia or the gravity torque has changed, learning is possible in a state where the moment or inertia and the gravity torque have both increased, or in a state where the moment of inertia and the gravity torque have both decreased. On the other hand, in a state where the moment of inertia has increased and the gravity torque has decreased, or in a state where the moment of inertia has decreased and the gravity torque has increased, the two components have changed in opposite directions, and therefore, a state in which learning should be stopped has occurred because erroneous learning will occur.

Therefore, when it is determined whether or a state in which learning should be stopped has occurred, and it is determined that a state in which learning should be stopped has occurred, because a configuration is used in which the reference gravity torque calculated the previous time is used as the new reference gravity torque as is, and learning processing using a deviation is not executed, it is possible to prevent erroneous learning and to improve the compensation accuracy.

There are two possible implementation methods of the learning cessation determining unit 59.

The first method is a method used to determine whether or not the direction in which gravity is applied and the turning force direction of the motor coincide. Learning is possible if the directions coincide, and the learning stopped state occurs when the directions do not coincide. Specifically, it is determined whether or not the sign of a gravity compensation torque TG_SWING generated about the turning axis by gravity coincides with that of the torque (SWING_TRQ_FIN−TG_SWING) that contributes to the acceleration of the turning axis. The product of (SWING_TRQ_FIN−TG_SWING) and TG_SWING is calculated, and a positive result indicates that the signs coincide and learning is possible, and a negative result indicates that the signs do not coincide and learning is stopped.

The second method is capable of determining, from the current attitude and the actual turning speed, whether the upper turning body 13 is moving in the descending direction of a slope, or moving in an ascending direction. Furthermore, depending on whether the absolute speed is increasing or decreasing, it is determined whether the upper turning body 13 is in a state where it is accelerating in a descending direction of a sloping surface, or the upper turning body 13 is in a state where it is decelerating in an ascending direction of a sloping surface.

Figure 8:
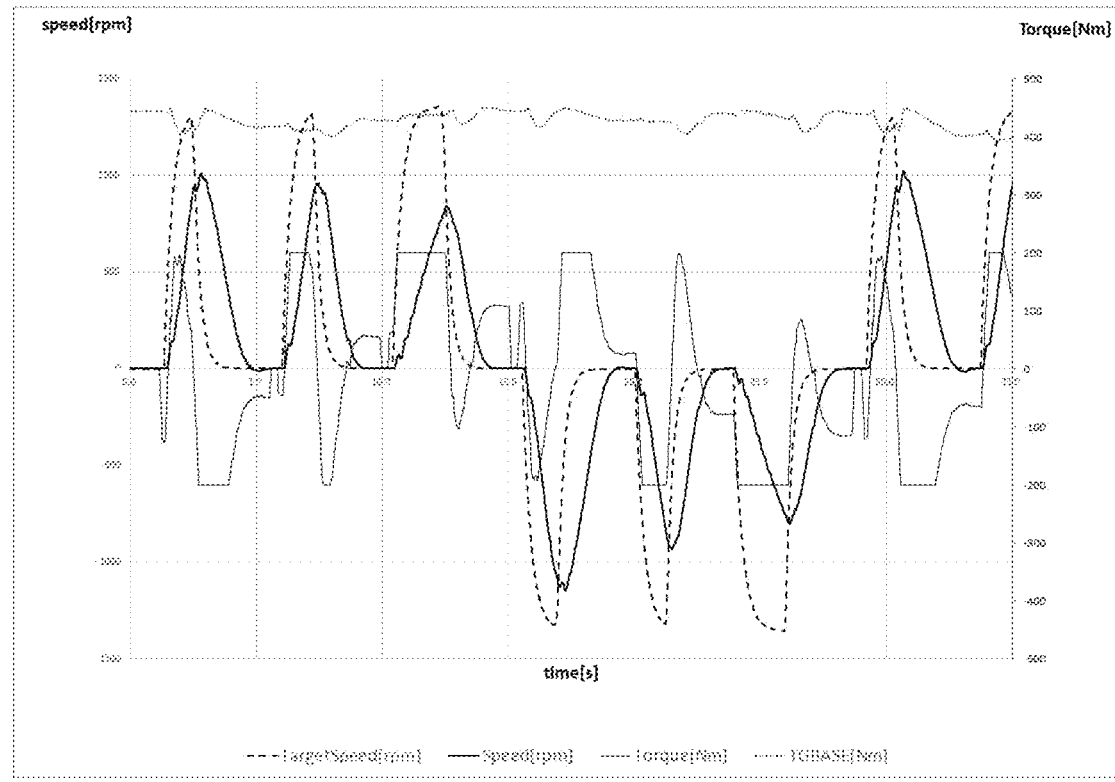
FIG. 8 is a diagram showing a turning control result of the backhoe of the first embodiment.
Figure 9:
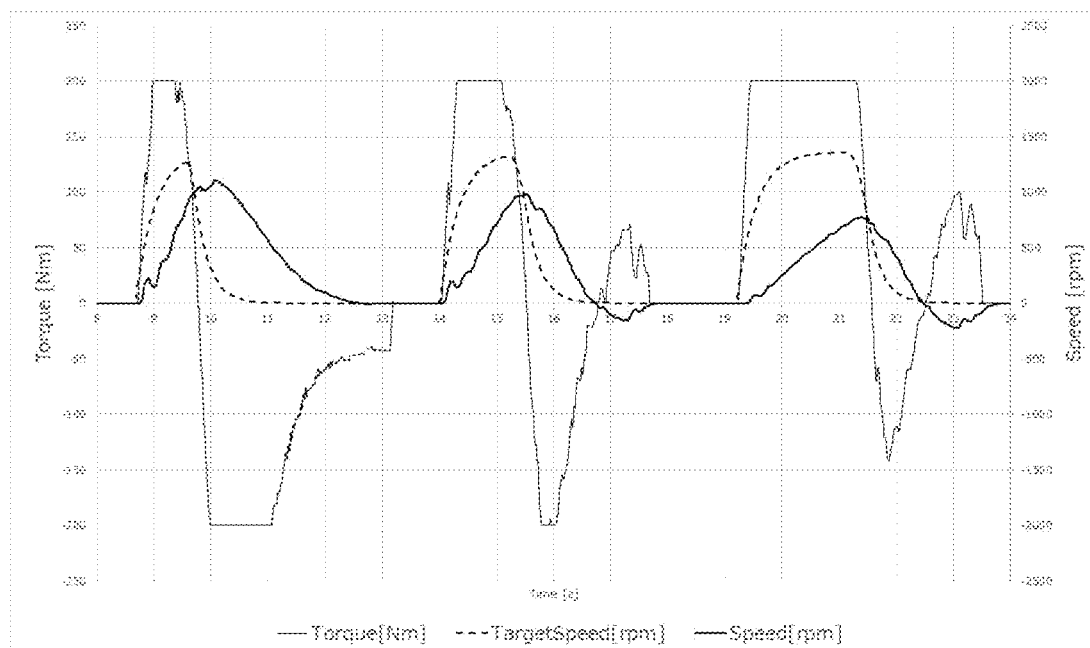
FIG. 9 is a diagram showing a conventional turning control result without correction by a gravity compensation torque.

A turning control result of the first embodiment and a conventional turning control result without correction by a gravity compensation torque will be comparatively described. FIG. 8 is a diagram showing a turning control result of the backhoe of the first embodiment. FIG. 9 is a diagram showing a conventional turning control result without correction by a gravity compensation torque. Both diagrams illustrate the torque, the target rotation speed, and the actual rotation speed when the backhoe is placed on ground having a slope of 15 degrees and the upper turning body 13 is turned. As shown in FIG. 9, during the turn at 14 to 18 seconds, and during the turn at 19 to 24 seconds, it can be seen that the actual rotation speed falls below zero even though the target rotation speed is zero. This illustrates a situation where the upper turning body 13 starts to drop due to gravity, and has been stopped by an electromagnetic brake.

In contrast to FIG. 9, in FIG. 8 it can be understood that the actual rotation speed does not fall too far when the target rotation speed is zero, and the torque component generated by gravity is being appropriately corrected. It can be understood that, although variation occurs in the reference gravity torque TG_BASE, which is the torque component generated by gravity in the reference attitude, it has also converged.

Second Embodiment

Figure 6:
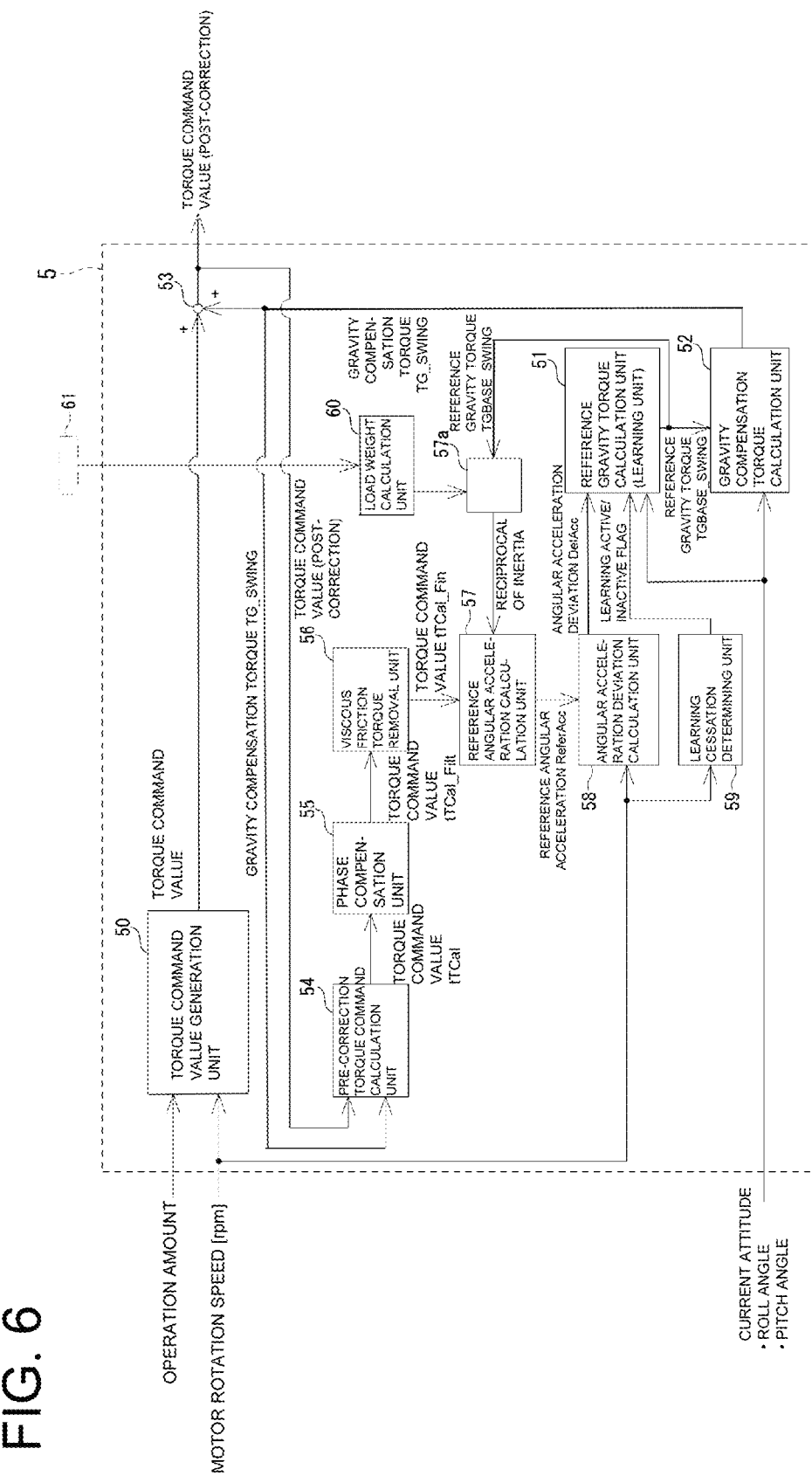
FIG. 6 is a diagram showing a turning control controller of a second embodiment.

A second embodiment will be described. The same components as those of the first embodiment are denoted by the same reference numbers, and the description will be omitted. As shown in FIG. 6, a load weight calculation unit 60 is provided that calculates a load weight of the work machine 12. The load weight calculation unit 60 calculates the load weight by inputting data from a sensor 61, such as a hydraulic sensor that measures the hydraulic pressure driving the work machine 12, or a load cell that measures the weight.

Furthermore, correlation data 57a is provided that associates a value representing the inertia (reciprocal of the inertia) of the upper turning body 13, which includes the work machine 12, with the load weight and the reference gravity torque in advance. Although the value representing the inertia is the reciprocal of the inertia in the present embodiment, it is not limited to this and may be the inertia itself. In the present embodiment, although the correlation data 57a employs a two-dimensional map, various changes are possible as long as it is data in which a value representing the inertia is associated with the load weight and the reference gravity torque.

The reference gravity torque and the inertia (moment of inertia) are not in a 1:1 relationship, and the inertia cannot be calculated directly from the reference gravity torque. However, in this way, because the inertia is associated in advance in the correlation data as an approximated value, a value representing the inertia (reciprocal of the inertia) can be derived and the reference angular acceleration can be calculated.

Further, because the association is not only with the reference gravity torque but also with the load weight, the only unknown term is the turning radius, and therefore, the accuracy of the inertia can be improved compared to the first embodiment.

Third Embodiment

Figure 7:
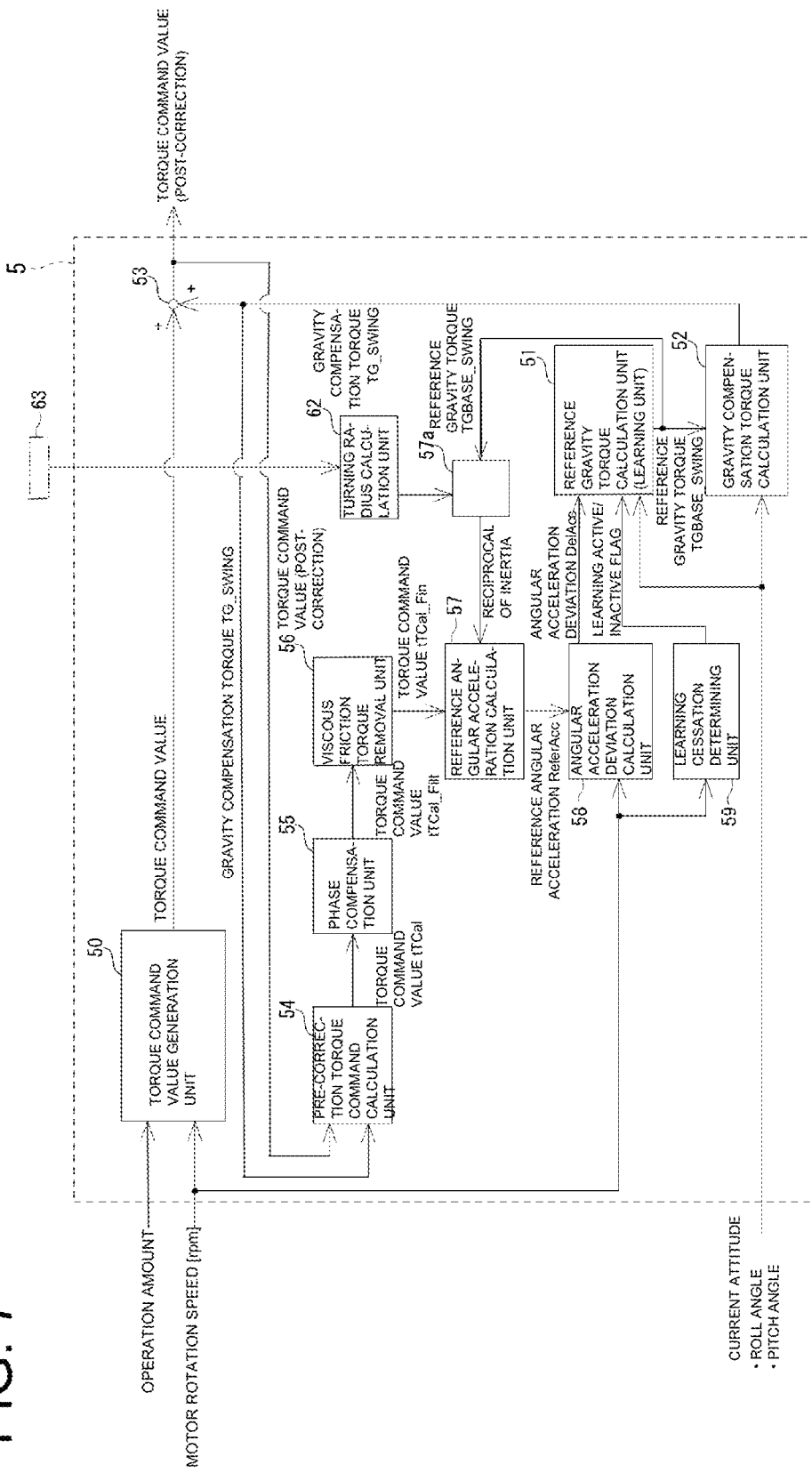
FIG. 7 is a diagram showing a turning control controller of a third embodiment.

A third embodiment will be described. The same components as those of the first embodiment are denoted by the same reference numbers, and the description will be omitted. As shown in FIG. 7, a turning radius calculation unit 62 is provided that calculates a turning radius of the work machine 12. The turning radius calculation unit 62 inputs data from a position detection sensor 63, which detects the stroke positions of the boom cylinder 12d and the arm cylinder 12e, specifies the angles of the boom 12a and the arm 12b from the stroke positions, and calculates the turning radius from the angles on the basis of forward kinematics.

Furthermore, correlation data 57a is provided that associates a value representing the inertia (reciprocal of the inertia) of the upper turning body 13, which includes the work machine 12, with the turning radius and the reference gravity torque in advance. Although the value representing the inertia is the reciprocal of the inertia in the present embodiment, it is not limited to this and may be the inertia itself. In the present embodiment, although the correlation data 57a employs a two-dimensional map, various changes are possible as long as it is data in which a value representing the inertia is associated with the turning radius and the reference gravity torque.

The reference gravity torque and the inertia (moment of inertia) are not in a 1:1 relationship, and the inertia cannot be calculated directly from the reference gravity torque. However, in this way, because the inertia is associated in advance in the correlation data as an approximated value, a value representing the inertia (reciprocal of the inertia) can be derived and the reference angular acceleration can be calculated.

Further, because the association is not only with the reference gravity torque but also with the turning radius, the only unknown term is the load weight, and therefore, the accuracy of the inertia can be improved compared to the first embodiment.

As described above, the construction machines of the first to third embodiments include:

an upper turning body 13 comprising a work machine 12;
a lower traveling body 11 that supports the upper turning body 13 so as to be capable of turning via a turning axis;
an electric turning motor 134 that causes the upper turning body 13 to turn;
a rotation speed acquisition unit (inverter 31) that acquires a value representing a rotation speed of the upper turning body 13 (motor rotation speed per unit time);
an attitude sensor 130 that detects a current attitude of the upper turning body 13;
a torque command value generation unit 50 that outputs a torque command value to the electric turning motor 134 according to an operation amount of an operation part;
a reference angular acceleration calculation unit 57 that calculates a reference angular acceleration ReferAcc to be generated when the electric turning motor 134 is driven at the torque command value;
a reference gravity torque calculation unit 51 that, on the basis of the current attitude and a deviation between an actual angular acceleration ActAcc obtained from the rotation speed and the reference angular acceleration ReferAcc, calculates a reference gravity torque TGBASE_SWING which is a torque component to be generated about the turning axis by gravity in a reference attitude;
a gravity compensation torque calculation unit 52 that, on the basis of the reference gravity torque TGBASE_SWING and the current attitude, calculates a gravity compensation torque TG_SWING for compensating a torque component generated about the turning axis by gravity in the current attitude; and
a correction unit 53 that corrects the torque command value with the gravity compensation torque TG_SWING so as to cancel a torque component generated about the turning axis by gravity in the current attitude.

As described above, a feed-forward control is provided that, on the basis of the current attitude and the reference gravity torque TGBASE_SWING, which is a torque component generated about the turning axis by gravity in the reference attitude, corrects the torque command value so as to cancel the torque component generated about the turning axis by gravity in the current attitude, and therefore, a control can be performed that cancels the torque component in advance even when a delay in the rotation speed caused by the torque component generated by gravity has not actually occurred.

Meanwhile, the reference gravity torque TGBASE_SWING, which is the torque component generated about the turning axis by gravity in the reference attitude, is calculated on the basis of the current attitude and the deviation between the actual angular acceleration ActAcc and the reference angular acceleration ReferAcc to be generated when the electric turning motor 134 is driven at the torque command value, and therefore, it is possible to appropriately cancel the torque component generated by gravity in the current attitude even when the weight changes, or when the boom or the arm is expanded or contracted.

Therefore, it is possible to comfortably perform turning motion on sloping ground without exhibiting the adverse effects of a torque component generated by gravity.

In the first to third embodiments, the reference gravity torque calculation unit 51 newly calculates the reference gravity torque TGBASE_SWING by executing learning processing, which cumulatively adds a value based on the deviation DelAcc and the current attitude to the reference gravity torque $TGBASE\_SWING_{i-1}$ calculated the previous time.

As described above, because a value based on the deviation DelAcc and the current attitude is cumulatively added to the reference gravity torque $TGBASE\_SWING_{i-1}$ calculated the previous time, the previous result can be learned and the compensation accuracy can be improved.

The deviation that occurs between the actual angular acceleration ActAcc and the reference angular acceleration ReferAcc to be generated on the basis of the torque command is caused by a change in the moment of inertia due to an expansion or contraction in the boom or the arm, or by a change in the gravity torque due to a change in the load weight. Because it is not possible to distinguish whether the moment of inertia or the gravity torque has changed, learning is possible in a state where the moment or inertia and the gravity torque have both increased, or in a state where the moment of inertia and the gravity torque have both decreased. On the other hand, in a state where the moment of inertia has increased and the gravity torque has decreased, or in a state where the moment of inertia has decreased and the gravity torque has increased, the two components are opposing each other, and therefore, a state in which learning should be stopped has occurred because erroneous learning will occur.

In the first to third embodiments, a learning cessation determining unit 59 is provided that determines whether or not a state in which learning should be stopped has occurred. The state in which learning should be stopped is a state where the upper turning body 13 is accelerating in a descending direction of a sloping surface, or a state where the upper turning body 13 is decelerating in an ascending direction of a sloping surface. The reference gravity torque calculation unit 51 is configured such that, when the learning cessation determining unit 59 determines that a state in which learning should be stopped has occurred, the reference gravity torque $TGBASE\_SWING_{i-1}$ calculated the previous time is used as the new reference gravity torque TGBASE_SWING, and learning processing using the angular acceleration deviation DelAcc is not executed.

In this way, when it is determined whether or a state in which learning should be stopped has occurred, and it is determined that a state in which learning should be stopped has occurred, because a configuration is used in which the reference gravity torque $TGBASE\_SWING_{i-1}$ calculated the previous time is used as the new reference gravity torque TGBASE_SWING as is, and learning processing using the deviation DelAcc is not executed, it is possible to prevent erroneous learning and to improve the compensation accuracy.

In the first to third embodiments, a phase compensation unit 55 is provided that performs processing that delays the phase of the torque command value before the torque command value is input to the reference angular acceleration calculation unit 57.

As a result of delays in communication and delays due to current control by the inverter, a shift occurs in the time axis between the turning motion (reference angular acceleration ReferAcc) estimated from the torque command value of the current instruction, and the turning motion (actual angular acceleration ActAcc) currently being detected. However, as described above, the shift in the time axis can be compensated by performing processing that delays the phase of the torque command value, and therefore, it is possible to match both of the time axes so that the accuracy of the control is improved.

In the first embodiment, correlation data 57a is provided that associates a value representing the inertia (reciprocal of the inertia) of the upper turning body 13, which includes the work machine 12, with the reference gravity torque TGBASE_SWING in advance. The reference angular acceleration calculation unit 57 calculates the reference angular acceleration ReferAcc on the basis of the torque command value and a value representing the inertia in the correlation data 57a (reciprocal of the inertia) corresponding to the reference gravity torque TGBASE_SWING.

The reference gravity torque and the inertia (moment of inertia) are not in a 1:1 relationship, and the inertia cannot be calculated directly from the reference gravity torque. However, undetermined variables in the correlation data 57a are approximated as having only small variations in the backhoe 1. In this way, because the inertia is associated in advance in the correlation data as an approximated value, a value representing the inertia (reciprocal of the inertia) can be derived and the reference angular acceleration ReferAcc can be calculated.

The second embodiment includes a load weight calculation unit 60 that calculates a load weight of the work machine 12, and correlation data 57a that associates a value representing the inertia (reciprocal of the inertia) of the upper turning body 13, which includes the work machine 12, with the load weight and the reference gravity torque TGBASE_SWING in advance.

The reference angular acceleration calculation unit 57 calculates the reference angular acceleration ReferAcc on the basis of the torque command value and a value representing the inertia (reciprocal of the inertia) corresponding to the reference gravity torque TGBASE_SWING and the load weight in the correlation data 57a.

The reference gravity torque and the inertia (moment of inertia) are not in a 1:1 relationship, and the inertia cannot be calculated directly from the reference gravity torque. However, undetermined variables in the correlation data 57a are approximated as having only small variations in the backhoe 1. In this way, because the inertia is associated in advance in the correlation data as an approximated value, a value representing the inertia (reciprocal of the inertia) can be derived and the reference angular acceleration ReferAcc can be calculated.

Further, because the association is not only with the reference gravity torque but also with the load weight, the only unknown term is the turning radius, and therefore, the accuracy of the inertia can be improved compared to the first embodiment.

The third embodiment includes a turning radius calculation unit 62 that calculates a turning radius of the work machine 12, and correlation data 57a that associates a value representing the inertia (reciprocal of the inertia) of the upper turning body 13, which includes the work machine 12, with the turning radius and the reference gravity torque TGBASE_SWING in advance.

The reference angular acceleration calculation unit 57 calculates the reference angular acceleration ReferAcc on the basis of the torque command value and a value representing the inertia (reciprocal of the inertia) corresponding to the reference gravity torque TGBASE_SWING and the turning radius in the correlation data 57a.

The reference gravity torque and the inertia (moment of inertia) are not in a 1:1 relationship, and the inertia cannot be calculated directly from the reference gravity torque. However, undetermined variables in the correlation data 57a are approximated as having only small variations in the backhoe 1. In this way, because the inertia is associated in advance in the correlation data as an approximated value, a value representing the inertia (reciprocal of the inertia) can be derived and the reference angular acceleration ReferAcc can be calculated.

Further, because the association is not only with the reference gravity torque but also with the turning radius, the only unknown term is the load weight, and therefore, the accuracy of the inertia can be improved compared to the first embodiment.

Although embodiments of the present disclosure have been described above with reference to the drawings, the specific configurations should not be considered to be limited to these embodiments. The scope of the present disclosure is defined not only by the description of the above embodiments but by the scope of the claims, and further, all modifications that fall within a meaning and scope equivalent to the scope of the claims are included.

It is possible to adopt the structures used in each of the above embodiments in other arbitrary embodiments.

DESCRIPTION OF REFERENCE NUMERALS

1 Backhoe (construction machine)
11 Lower traveling body
12 Work machine
13 Upper turning body
130 Attitude sensor
131c Work operation lever (operation part)
134 Electric turning motor
31 Inverter (rotation speed acquisition unit)
50 Torque command value generation unit
51 Reference gravity torque calculation unit
52 Gravity compensation torque calculation unit
53 Correction unit
55 Phase compensation unit
57 Reference angular acceleration calculation unit
57a Correlation data
59 Learning cessation determining unit
60 Load weight calculation unit
62 Turning radius calculation unit

The invention claimed is:
1. A construction machine including:
an upper turning body comprising a work machine;
a lower traveling body configured to support the upper turning body such that the upper turning body is configured to turn via a turning axis;
an electric turning motor configured to drive the upper turning body to turn; and a controller configured to be in communication with the electric turning motor, the controller further configured to:
receive a value representing a rotation speed of the upper turning body;
receive data indicative of a current attitude of the upper turning body;
determine a torque command value for the electric turning motor based on an operation amount of an operation part of the upper turning body;
determine a reference angular acceleration based on the torque command value, wherein the reference angular acceleration is an angular acceleration to be generated when the electric turning motor is driven at the torque command value;
determine a reference gravity torque based on the current attitude and a deviation between an actual angular acceleration obtained from the rotation speed and the reference angular acceleration, wherein the reference gravity torque is a torque component generated about the turning axis by gravity in a reference attitude of the upper turning body;
determine a gravity compensation torque, used to compensate a torque component generated about the turning axis by gravity in the current attitude, based on the reference gravity torque and the current attitude; and
determine a corrected torque command value based on the torque command value and the gravity compensation torque so as to remove a torque component generated about the turning axis by gravity in the current attitude from the torque command value.

2. The construction machine according to claim 1, wherein the controller is configured to determine the reference gravity torque by executing learning processing, which cumulatively adds a value based on the deviation and the current attitude to a previously determined reference gravity torque.

3. The construction machine according to claim 2, wherein:
the controller is configured to determine whether or not a state in which the learning processing should be stopped has occurred,
the state in which the learning processing should be stopped is a state where the upper turning body is accelerating in a descending direction of a sloping surface, or a state where the upper turning body is decelerating in an ascending direction of a sloping surface, and
if it is determined that a state in which the learning processing should be stopped has occurred, the previously determined reference gravity torque is used as a new reference gravity torque, and the learning processing using the deviation is not executed.

4. The construction machine according to claim 1, wherein the controller is configured to process the torque command value so as to delay a phase of the torque command value before the reference angular acceleration is determined.

5. The construction machine according to claim 1, wherein:
the controller is configured to receive correlation data that associates a value representing an inertia of the upper turning body, which includes the work machine, with the reference gravity torque, and
the reference angular acceleration is determined based on the torque command value and the value associated with the reference gravity torque in the correlation data.

6. The construction machine according to claim 1, wherein
the controller is configured to:
determine a load weight of the work machine; and
receive correlation data that associates a value indicating an inertia of the upper turning body, which includes the work machine, with the load weight and the reference gravity torque, and
the reference angular acceleration is determined based on the torque command value and the value associated with the reference gravity torque and the load weight in the correlation data.

7. The construction machine according to claim 1, wherein the controller is configured to:
determine a turning radius of the work machine, and
receive correlation data that associates a value indicating an inertia of the upper turning body, which includes the work machine, with the turning radius and the reference gravity torque, and
wherein the reference angular acceleration is determined based on the torque command value and the value associated with the reference gravity torque and the turning radius in the correlation data.

8. The construction machine according to claim 1, wherein the controller is further configured to control the electric turning motor based on the corrected torque command value.

9. The construction machine according to claim 1, wherein the data indicative of the current attitude of the upper turning body includes a roll angle of the upper turning body and a pitch angle of the upper turning body.

10. The construction machine according to claim 1, wherein the data indicative of the current attitude of the upper turning body is received from a sensor.

11. The construction machine according to claim 10, wherein the sensor includes a gyroscope.

12. The construction machine according to claim 1, wherein the reference attitude is an attitude of the upper turning body in which a moment of a force generated by gravity acts completely on a rotation axis associated with the upper turning body.

13. The construction machine according to claim 1, wherein, to determine the reference angular acceleration, the controller is further configured to multiply the torque command value by a reciprocal of an inertia of the upper turning body.

14. The construction machine according to claim 1, wherein, to determine the gravity compensation torque, the controller is configured to multiply the reference gravity torque by a cosine function of a pitch angle of the current attitude and a result of a sine function of a roll angle of the current attitude.

15. The construction machine according to claim 4, wherein, to process the torque command value so as to delay a phase of the torque command value, the controller is further configured to apply a low-pass filter to the torque command value.

16. A method comprising:
receiving a value representing a rotation speed of an upper turning body of a machine, wherein the upper turning body is configured to turn about a turning axis relative to a lower traveling body of the machine;
receiving data indicative of a current attitude of the upper turning body;

determining a torque command value for an electric turning motor of the machine according to an operation amount of an operation part of the upper turning body, wherein the electric turning motor is configured to drive the upper turning body to turn;

determining a reference angular acceleration based on the torque command value, wherein the reference angular acceleration includes an angular acceleration to be generated when the electric turning motor is driven at the torque command value;

determining a reference gravity torque based on the current attitude and a deviation between an actual angular acceleration obtained from the rotation speed and the reference angular acceleration, wherein the reference gravity torque includes a torque component generated about the turning axis by gravity in a reference attitude of the upper turning body;

determining a gravity compensation torque, used to compensate a torque component generated about the turning axis by gravity in the current attitude, based on the reference gravity torque and the current attitude;

determining a corrected torque command value based on the torque command value and the gravity compensation torque so as to remove a torque component generated about the turning axis by gravity in the current attitude from the torque command value; and controlling the electric turning motor based on the corrected torque command value.

17. The method according to claim 16, wherein determining the reference gravity torque includes executing learning processing that cumulatively adds a value based on the deviation and the current attitude to a previously determined reference gravity torque.

18. The method according to claim 17, further comprising:

determining that a state exists in which the learning processing should be stopped, and wherein:

the state in which the learning processing should be stopped is:

a state where the upper turning body is accelerating in a descending direction of a sloping surface, or a state where the upper turning body is decelerating in an ascending direction of a sloping surface, and in response to determining that the state exists:

the previously determined reference gravity torque is used as a new reference gravity torque, and the learning processing using the deviation is not executed.

19. The method according to claim 16, further comprising, prior to determining the reference angular acceleration, processing the torque command value so as to delay a phase of the torque command value.

20. The method according to claim 16, wherein the data indicative of the current attitude of the upper turning body includes a roll angle of the upper turning body and a pitch angle of the upper turning body.

* * * * *